(12) United States Patent
Fujiwara (10) Patent No.: US 9,290,151 B2
(45) Date of Patent: Mar. 22, 2016

(54) OCCUPANT PROTECTION SYSTEM FOR VEHICLE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/585,667

(22) Filed: Dec. 30, 2014

(65) Prior Publication Data
US 2015/0197209 A1 Jul. 16, 2015

(30) Foreign Application Priority Data
Jan. 14, 2014 (JP) ................................. 2014-004601

(51) Int. Cl.
*B60R 21/207* (2006.01)
*B60R 21/231* (2011.01)

(52) U.S. Cl.
CPC ............. *B60R 21/231* (2013.01); *B60R 21/207* (2013.01); *B60R 2021/23161* (2013.01)

(58) Field of Classification Search
CPC ............ B60R 21/01512; B60R 21/207; B60R 21/231; B60R 21/23138; B60R 21/2338; B60R 2021/0006; B60R 2021/161; B60R 2021/23146; B60R 2021/23161; B60R 2021/23382
See application file for complete search history.

(56) References Cited

U.S. PATENT DOCUMENTS

| | | | | |
|---|---|---|---|---|
| 5,499,840 A * | 3/1996 | Nakano | | 280/730.1 |
| 6,371,513 B1 | 4/2002 | Fujimoto et al. | | |
| 7,971,901 B2 * | 7/2011 | Tomitaka et al. | ......... | 280/730.2 |
| 8,210,566 B2 * | 7/2012 | Fukawatase et al. | ...... | 280/730.1 |
| 8,267,424 B2 * | 9/2012 | Tomitaka et al. | ......... | 280/730.2 |
| 8,282,126 B2 * | 10/2012 | Wiik et al. | .................. | 280/730.2 |
| 8,353,529 B2 * | 1/2013 | Tomitaka et al. | ......... | 280/730.2 |
| 8,360,469 B2 * | 1/2013 | Wiik et al. | .................. | 280/743.2 |
| 8,684,408 B2 * | 4/2014 | Thomas et al. | ............ | 280/743.2 |
| 8,702,122 B2 * | 4/2014 | Tomitaka et al. | ......... | 280/730.2 |
| 8,985,625 B2 * | 3/2015 | Gwon et al. | ............... | 280/743.1 |
| 9,004,526 B2 * | 4/2015 | Fukawatase et al. | ...... | 280/730.1 |
| 9,016,718 B2 * | 4/2015 | Fukawatase et al. | ...... | 280/730.2 |
| 2005/0236819 A1 | 10/2005 | Riedel et al. | | |
| 2007/0108745 A1 | 5/2007 | Belwafa et al. | | |
| 2009/0200775 A1 * | 8/2009 | Sugimoto et al. | .......... | 280/730.2 |

(Continued)

FOREIGN PATENT DOCUMENTS

| | | |
|---|---|---|
| DE | 19603106 A1 | 7/1997 |
| DE | 19648529 C1 | 5/1998 |

(Continued)

*Primary Examiner* — Laura Freedman
(74) *Attorney, Agent, or Firm* — Oliff PLC (57) ABSTRACT

An occupant protection system for a vehicle includes right and left vehicle seats; right and left inflators each mounted in a center-side side portion, as viewed in the vehicle width direction, of each of seat backs of the right and left vehicle seats; and right and left far-side airbags each mounted in the center-side side portion of each of the seat backs. The far-side airbag is partitioned into a front bag portion that protrudes toward a vehicle forward side of the side portion in an inflated and deployed state, and a rear bag portion located on a vehicle rearward side of the front bag portion. The rear bag portion is adapted to have an internal pressure higher than that of the front bag portion in the inflated and deployed state. The rear bag portion is adapted to be compressed between the seat backs when the vehicle seats approach each other.

19 Claims, 6 Drawing Sheets

(56) References Cited

U.S. PATENT DOCUMENTS

| | | | |
|---|---|---|---|
| 2009/0302584 A1* | 12/2009 | Sugimoto et al. | 280/730.1 |
| 2010/0140906 A1 | 6/2010 | Honda et al. | |
| 2012/0049498 A1 | 3/2012 | Wiik et al. | |
| 2012/0091697 A1 | 4/2012 | Wiik et al. | |
| 2014/0042733 A1* | 2/2014 | Fukawatase | 280/730.2 |
| 2015/0084315 A1* | 3/2015 | Acker et al. | 280/728.2 |
| 2015/0115576 A1* | 4/2015 | Acker et al. | 280/728.2 |
| 2015/0158453 A1* | 6/2015 | Fujiwara | 280/730.2 |

FOREIGN PATENT DOCUMENTS

| | | |
|---|---|---|
| DE | 19944243 A1 | 4/2000 |
| DE | 102007051282 A1 | 4/2009 |
| DE | 102009057420 A1 | 6/2010 |
| GB | 2309440 A | 7/1997 |
| JP | H07-267037 A | 10/1995 |
| JP | 2005-306377 A | 11/2005 |
| JP | 2008296642 A * | 12/2008 |
| JP | 2008308102 A * | 12/2008 |
| JP | 2009-280023 A | 12/2009 |
| JP | 2010-070003 A | 4/2010 |
| JP | 2010-143233 A | 7/2010 |
| JP | 2012-025182 A | 2/2012 |
| JP | 2012-051557 A | 3/2012 |
| JP | 2012-081958 A | 4/2012 |
| JP | 2013-119326 A | 6/2013 |
| JP | 2013124063 A * | 6/2013 |
| WO | WO 2009035117 A1 * | 3/2009 ............ B60R 21/231 |
| WO | 2012/060574 A2 | 5/2012 |

* cited by examiner

OCCUPANT PROTECTION SYSTEM FOR VEHICLE

INCORPORATION BY REFERENCE

The disclosure of Japanese Patent Application No. 2014-004601 filed on Jan. 14, 2014 including the specification, drawings and abstract is incorporated herein by reference in its entirety.

BACKGROUND OF THE INVENTION

1. Field of the Invention

The invention relates to an occupant protection system for a vehicle which protects occupants by means of far-side airbags at the time of a side collision.

2. Description of Related Art

In a system described in Japanese Patent Application Publication No. 2010-070003 (JP 2010-070003 A), airbag devices (far-side airbag devices) are respectively installed in center-side side portions, as viewed in the vehicle width direction, of respective seat backs of right and left vehicle seats disposed adjacent to each other in the vehicle width direction. The far-side airbag device inflates and deploys an airbag against the head of an occupant seated on one side (which will be called. "non-collision side") opposite to the side on which a side collision occurs (which will be called "collision side"), such that the airbag expands toward the collision side. As a result, the head that makes an inertial movement toward the collision side due to an impact of the side collision is received and supported by the airbag.

In a far-side airbag device described in Japanese Patent Application Publication No. 2012-051557 (JP 2012-051557 A), a tether joined to a seat back frame is passed through an opening formed in a non-inflation region of an airbag, and is connected to a front end of the airbag. In the far-side airbag device, the above-mentioned tether serves to control the trajectory of deployment of the airbag at the time of a side collision, and place an effective restraint on an occupant seated on the non-collision side.

In the above-described far-side airbag devices, there exists no reaction force plane that applies reaction force from the collision side to the airbag (far-side airbag) that is inflated and deployed; thus, there is room for improvement in terms of the far-side occupant restraint performance.

SUMMARY OF THE INVENTION

The invention provides an occupant protection system for a vehicle, which contributes to improvement in the occupant restraint performance of a far-side airbag(s).

A first aspect of the invention is concerned with an occupant protection system for a vehicle. The occupant protection system for the vehicle includes right and left vehicle seats disposed adjacent to each other in a vehicle width direction and adapted to approach each other in the vehicle width direction due to an impact at the time of a side collision, right and left inflators each mounted in a center-side side portion, as viewed in the vehicle width direction, of each of seat backs of the right and left vehicle seats, each of the inflators being adapted to be activated at the time of the side collision so as to generate gas, and right and left far-side airbags each mounted in the center-side side portion, as viewed in the vehicle width direction, of each of the seat backs. Each of the far-side airbags is adapted to inflate and deploy when the gas is supplied from a corresponding one of the inflators. Each of the far-side airbags is partitioned into a front bag portion that protrudes toward a vehicle forward side of the side portion when the airbag is in an inflated and deployed state, and a rear bag portion located on a vehicle rearward side of the front bag portion. The rear bag portion is adapted to have an internal pressure higher than that of the front bag portion when the airbag is inflated and deployed. The rear bag portion of each of the far-side airbags is adapted to be compressed between the seat backs when the vehicle seats approach each other.

According to the above aspect of the invention, when the vehicle comes into a side collision, the right and left inflators mounted in the center-side side portions, as viewed in the vehicle width direction, of the respective seat backs of the right and left vehicle seats are activated, and the right and left far-side airbags mounted in the side portions of the seat backs are inflated and deployed. Each of the far-side airbags is partitioned into the front bag portion that protrudes toward the vehicle forward side of the side portion when the airbag is in the inflated and deployed state, and the rear bag portion located on the vehicle rearward side of the front bag portion and having an internal pressure that becomes higher than that of the front bag portion.

When the vehicle comes into a side collision, the right and left vehicle seats approach each other in the vehicle width direction, due to an impact of the collision. With the vehicle seats approaching each other, the respective rear bag portions of the right and left far-side airbags are compressed between the right and left seat backs. As a result, the impact is absorbed, and each of the far-side airbags provides a reaction force plane that applies reaction force to the other airbag, so that the internal pressure of each far-side airbag is increased. Consequently, the restraint performance is improved when one of the far-side airbags receives an occupant on the non-collision side.

A second aspect of the invention is concerned with an occupant protection system for a vehicle. The occupant protection system for the vehicle includes right and left vehicle seats disposed adjacent to each other in a vehicle width direction and adapted to approach each other in the vehicle width direction due to an impact at the time of a side collision, an inflator mounted in a center-side side portion, as viewed in the vehicle width direction, of a seat back of one of the right and left vehicle seats, the inflator being adapted to be activated at the time of the side collision so as to generate gas, and a far-side airbag mounted in the center-side side portion and adapted to inflate and deploy when the gas is supplied from inflator. The far-side airbag is partitioned into a front bag portion that protrudes toward a vehicle forward side of the side portion when the airbag is in an inflated and deployed state, and a rear bag portion located on a vehicle rearward side of the front bag portion. The rear bag portion is adapted to have an internal pressure higher than that of the front bag portion when the airbag is inflated and deployed. The rear bag portion is adapted to be compressed between the seat backs of the right and left vehicle seats when the vehicle seats approach each other.

According to the above aspect of the invention, when the vehicle comes into a side collision, the inflator mounted in the center-side side portion, as viewed in the vehicle width direction, of the seat back of one of the right and left vehicle seats is activated, and the far-side airbag mounted in the side portion is inflated and deployed. The far-side airbag is partitioned into the front bag portion that protrudes toward the vehicle forward side of the side portion when the airbag is in the inflated and deployed state, and the rear bag portion located on the vehicle reward side of the front bag portion and having an internal pressure that becomes higher than that of the front bag portion.

When the vehicle comes into a side collision, the right and left vehicle seats approach each other in the vehicle width direction, due to an impact of the collision. With the vehicle seats approaching each other, the rear bag portion of the far-side airbag is compressed between the right and left seat backs. As a result, the impact is absorbed, and a reaction force plane of the far-side airbag is sure to be provided, so that the internal pressure of the far-side airbag is increased. Consequently, the restraint performance is improved when the far-side airbag receives an occupant on the non-collision side.

As described above, the occupant protection system for the vehicle according to the first and second aspects of the invention contributes to improvement in the occupant restraint performance of the far-side airbag(s).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

An occupant protection system 10 for a vehicle according to a first embodiment of the invention will be described with reference to FIG. 1 through. FIG. 3. Arrow FR, arrow UP, and arrow OUT denoted as needed in each of the drawings respectively indicate the front direction (travelling direction) of the vehicle, upward direction, and the outer side in the vehicle width direction. When the front-back direction, lateral direction, and the up-down direction are simply referred to in the following description, they represent the front-back or longitudinal direction of the vehicle, the lateral direction (width direction) of the vehicle, and the up-down direction of the vehicle, respectively.

(Construction)

Figure 1:
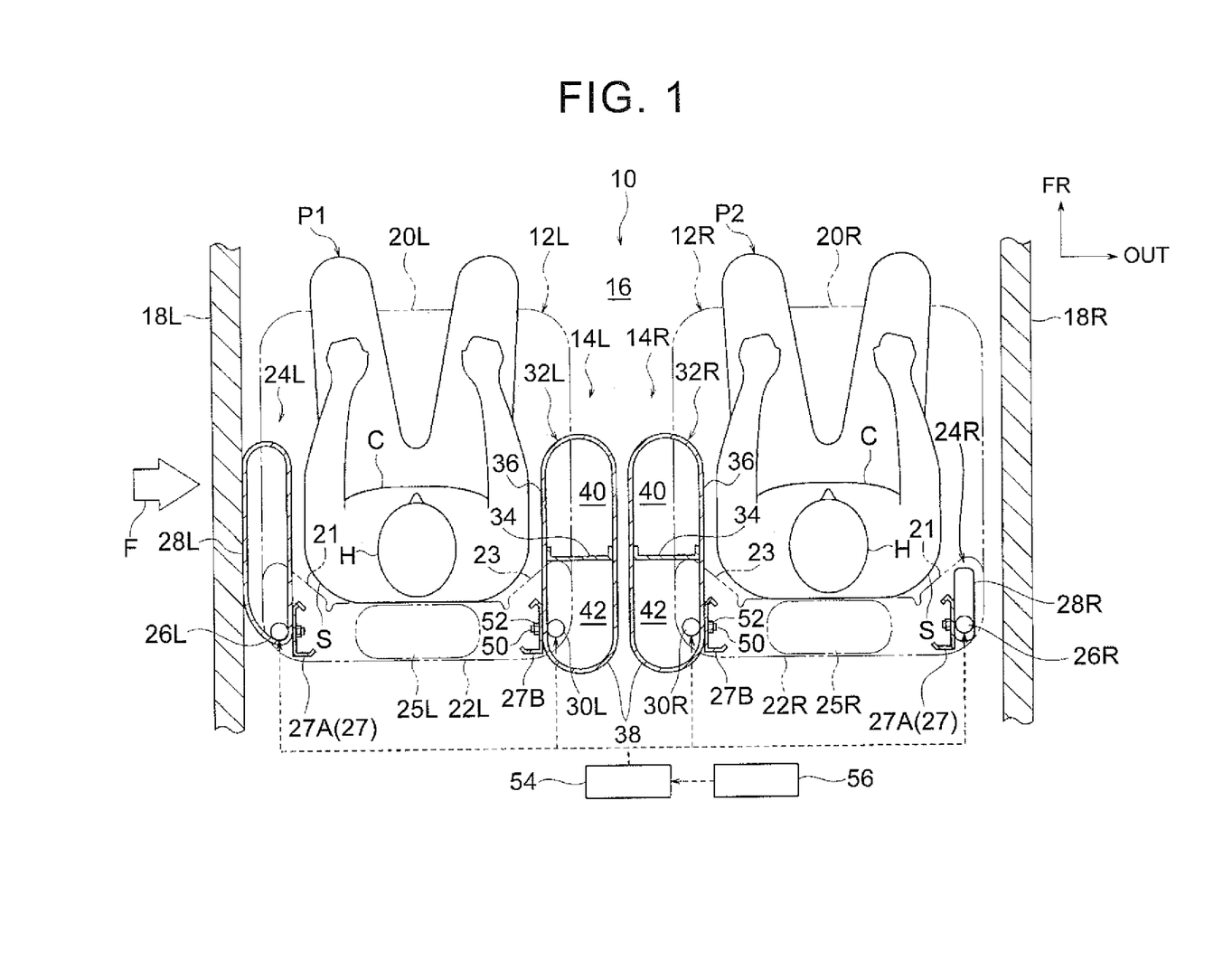
FIG. 1 is a planar sectional view showing the construction of a front part of a vehicle interior of an automobile in which an occupant protecting system for a vehicle according to a first embodiment of the invention is employed.
Figure 2:
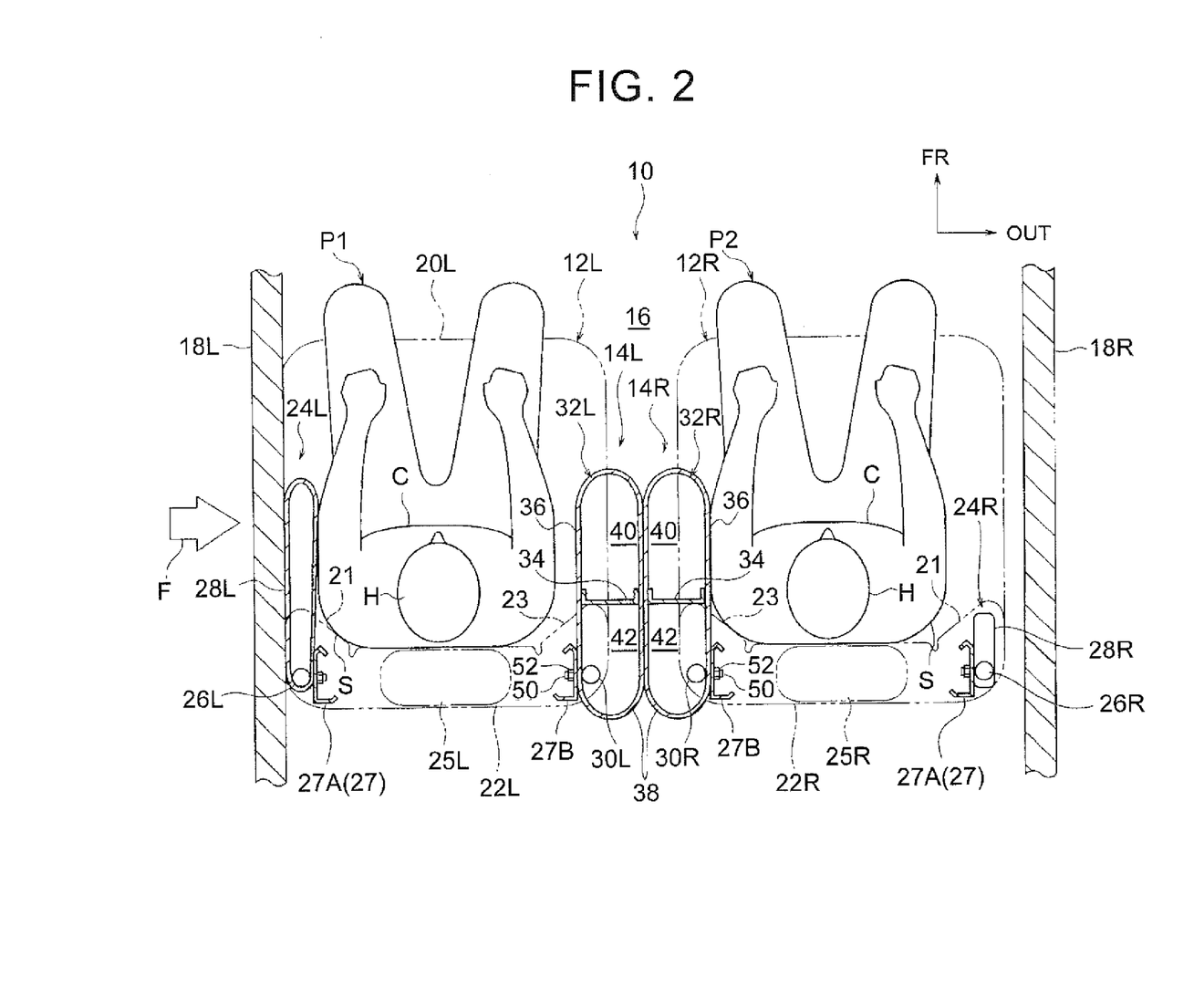
FIG. 2 is a planar sectional view corresponding to that of FIG. 1, showing a condition in which right and left vehicle seats approach each other in a vehicle width direction, due to an impact of a side collision.
Figure 3:
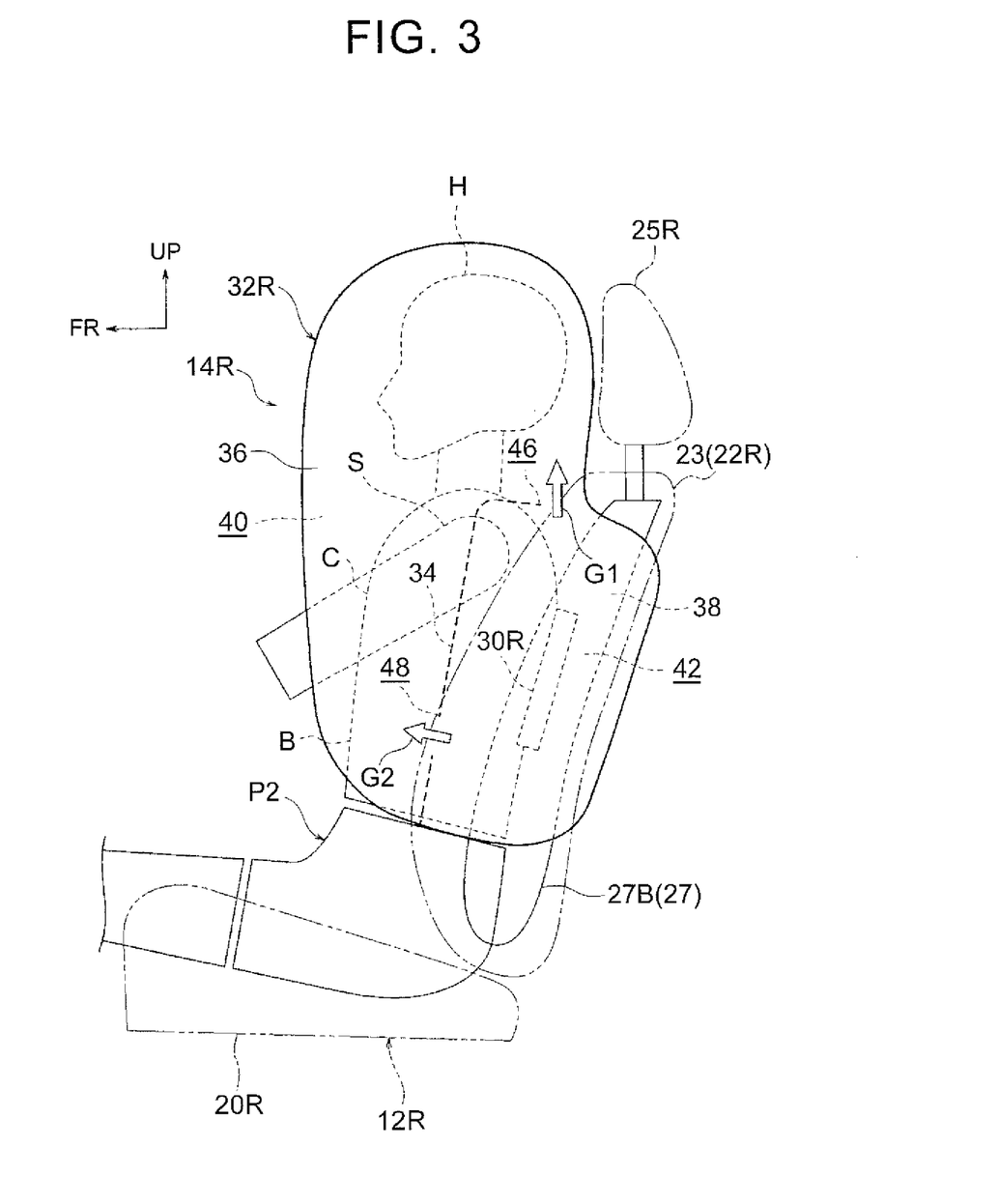
FIG. 3 is a side view taken when the right-hand vehicle seat as a constituent member of the vehicular occupant protection system according to a first embodiment of the invention is viewed from the center side in the vehicle width direction, which view shows a condition in which a far-side airbag is inflated and deployed.

As shown in FIG. 1 and FIG. 2, the occupant protection system 10 for the vehicle according to this embodiment consists of right and left vehicle seats 12R, 12L disposed adjacent to each other in the vehicle width direction, and right and left far-side airbag devices 14R, 14L installed in the corresponding vehicle seats 12R, 12L. The right and left vehicle seats 12R, 12L are driver's seat and passenger seat of the vehicle, for example, and are disposed between a right side portion 18R and a left side portion 18L of the vehicle in a front part of a vehicle interior 16. In FIG. 1 and FIG. 2, the right side portion 18R and the left side portion 18L of the vehicle are schematically illustrated.

Each of the vehicle seats 12L, 12R includes a seat cushion 20L, 20R for seating an occupant P1, P2, a seat back 22L, 22R that provides a backrest for the occupant P1, P2, and a headrest 25L, 25R that supports the head H of the occupant P1, P2. In FIG. 1 and FIG. 2, a member denoted by reference number 27A in FIG. 1 and FIG. 2 is a door-side side frame included in a seat back frame 27 as a framework member of the seat back 22L, 22R. In FIG. 1-FIG. 3, a member denoted by reference number 27B in FIG. 1-FIG. 3 is a tunnel-side side frame included in the seat back frame 27.

The seat cushion 20L, 20R is coupled to a floor (not shown) of a vehicle body via a seat slide mechanism (not shown), such that its longitudinal position can be adjusted relative to the floor. The seat back 22L, 22R is coupled to a rear end portion of the corresponding seat cushion 20L, 20R via a reclining mechanism (not shown), such that the reclining angle of the seat back 22L, 22R relative to the seat cushion 20L, 20R can be adjusted.

When the vehicle comes into a side-impact collision, the right and left vehicle seats 12R, 12L constructed as described above approach each other in the vehicle width direction, due to the impact of the side collision. For example, when another vehicle collides with the left side portion 18L of the vehicle, the left-hand vehicle seat 12L is displaced toward the center in the vehicle width direction, relative to the vehicle body, due to a load applied from the left side portion 18L into the vehicle interior 16 due to the impact of the side collision. At this time, the right-hand vehicle seat 12R is displaced toward the center in the vehicle width direction, relative to the vehicle body, under the inertia force caused by the above impact (as shown in FIG. 2).

Similarly, when a side collision occurs to the right side portion 18R, the right-hand vehicle seat 12R is displaced toward the center in the vehicle width direction, due to a load applied from the right side portion 18R into the vehicle interior 16 due to the impact of the side collision, and the left side vehicle seat 12L is displaced toward the center in the vehicle width direction, relative to the vehicle body, under the inertia force. At the time of each displacement, a part of the framework of the vehicle seat 12L, 12R is deformed. The deformation includes elastic deformation in a rigid region, in addition to plastic deformation of a part of the framework.

Side airbag devices 24R, 24L are mounted (installed) in door-side side portions 21 (outer side portions as viewed in the vehicle width direction) of the seat backs 22R, 22L of the above-described right and left vehicle seats 12R, 12L. These side airbag devices 24R, 24L are arranged to inflate and deploy side airbags 28R, 28L toward the vehicle forward sides of the respective door-side side portions 21, using pressure of gas generated by inflators 26R, 26L. In FIG. 1 and FIG. 2, the side airbag 28L mounted in the left-hand seat back 22L is inflated and deployed, while the side airbag 28R mounted in the right-hand seat back 22R is not inflated and deployed. These side airbag devices 24R, 24L are general ones, and therefore will not be described in detail.

The far-side airbag devices 14R, 14L are respectively mounted in tunnel-side side portions 23 (side portions closer to the center as viewed in the vehicle width direction) of the right and left seat backs 22R, 22L. As will be described later in detail, when a side collision is detected while occupants are seated in the right and left vehicle seats, the inflator of the collision-side side airbag device, and the inflators (right and left inflators) of both of the right and left far-side airbag devices are activated. When a side collision is detected while no occupant is seated in the collision-side vehicle seat, the inflator of the collision-side side airbag device is not activated, but the inflators (right and left inflators) of both of the right and left far-side airbag devices are activated. The right and left far-side airbag devices 14R, 14L have substantially the same configuration, except that they are configured symmetrically. In the following, the right and left far-side airbag devices 14R, 14L will be described in detail.

The right and left far-side airbag devices 14R, 14L are constituent members of the vehicular occupant protection system 10, and each of the far-side airbag devices 14R, 14L includes, as main components, an inflator 30R, 30L as a gas generator, and a far-side airbag 32R, 32L as a bag body. At normal times, the far-side airbag 32R, 32L is assembled with the inflator 30R, 30L, etc. into a module, and is housed in a folded state in a corresponding one of the tunnel-side side portions 23.

The far-side airbags 32L, 32R inflate and deploy toward the center of the occupants P1, P2 in the vehicle width direction, under the pressure of gas generated from the inflators 30L, 30R (as shown in FIG. 1-FIG. 3). During the inflation and deployment, a seat skin and a seat back pad (both of which are not shown) provided in the tunnel-side side portion 23 are ruptured in response to the expansion pressure of the corresponding far-side airbag 32L, 32R. The front-hack and up-down directions of the far-side airbags 32L, 32R mentioned in the following description indicate the directions of the far-side airbags 32L, 32R when they are in an inflated and deployed state, unless otherwise noted, and substantially coincide with the front-back and up-down directions of the seat backs 22L, 22R.

Each of the far-side airbags 32L, 32R is formed in an elongate, bag-like shape, using two base cloths cut out from a nylon-containing or polyester-containing fabric material and superposed on each other with their outer peripheral portions sewn together. The far-side airbag 32L, 32R inflates and deploys so as to extend in a longitudinal direction that is in parallel with the up-down direction of the vehicle (see FIG. 3). The method of producing the far-side airbags 32L, 32R is not limited to the above-described method, but may be changed as needed. For example, the bag-like far-side airbag 32L, 32R may be produced by folding a single base cloth in half, and sewing its outer peripheral portion.

A front-rear partition tether 34 is provided as a front-rear partition in the interior of each of the far-side airbags 32L, 32R. The front-rear partition tether 34 is formed by cutting a fabric material similar to that of the base cloths of the far-side airbag 32L, 32R, into an elongate, belt-like shape. One of the opposite long side edges of the partition tether 34 is sewn to one of the base cloths of the far-side airbag 32L, 32R, and the other long side edge is sewn to the other of the base cloths of far-side airbag 32L, 32R. With the front-rear partition tether 34 thus provided, the far-side airbag 32L, 32R is partitioned or divided into a front bag portion 36 for restraining front portions of a shoulder part S, a chest part C, and a belly part B, and a head part H, of the occupant P, and a rear bag portion 38 for restraining rear portions of the shoulder part S, chest part C and belly part B. The manner of setting the front-rear partition tether 34 is not limited to the one as described above, but may be changed as needed. For example, the entire area of the shoulder part S may be restrained by the upper part of the rear bag portion 38.

The interior of the front bag portion 36 is a front chamber 40, and the interior of the rear bag portion 38 is a rear chamber 42. The front chamber 40 and the rear chamber 42 communicate with each other, via an upper communication aperture 46 provided in an upper end portion of the front-rear partition tether 34, and a lower communication aperture 48 provided in a lower portion of the front-rear partition tether 34. The locations where the communication apertures through which the front chamber 40 and the rear chamber 42 communicate with each other are formed are not limited to those as described above, but may be changed as needed.

On the other hand, the inflators 30L, 30R are housed in the respective rear bag portions 38 of the far-side air bags 32L, 32R. Each of the inflators 30L, 30R is a so-called cylinder-type inflator formed in a cylindrical shape, and is mounted in an intermediate portion of the rear bag portion 38 as viewed in the front-back direction and the up-down direction, such that its axial direction is substantially parallel with the height direction of the seat back 22L, 22R.

A pair of upper and lower stud bolts 50 (see FIG. 1 and FIG. 2) protrude from an outer periphery of each of the inflators 30L, 30R, toward the outer side in the vehicle width direction (or toward the inner side in the seat width direction). These stud bolts 50 pass through the base cloth of the far-side airbag 32L, 32R and the corresponding tunnel-side side frame 27B, and a nut 52 is screwed on a distal end of each of the stud bolts 50. With this arrangement, the far-side airbags 32L, 32R are fastened and fixed to the tunnel-side side frames 27B via the inflators 30L, 30R. The inflator 30L, 30R may be fixed to a central portion of the corresponding tunnel-side side frame 27B as viewed in the up-down direction and the front-back direction.

If the inflator 30L, 30R is activated (started), gas is ejected radially from a gas ejector(s) provided in at least one of upper and lower end portions of the inflator 30L, 30R, into the corresponding rear bag portion 38. The gas ejected into the rear bag portion 38 passes through the upper communication aperture 46 and the lower communication aperture 48, and is supplied into the front bag portion 36 (see arrows G1, G2 in FIG. 3). As a result, the far-side airbag 32L, 32R inflates and deploys.

During the inflation and deployment, the gas ejected from the inflator 30L, 30R is supplied into the rear bag portion 38, and then supplied into the front bag portion 36 through the upper and lower communication apertures 46, 48; therefore, the internal pressure of the rear bag portion 38 becomes higher than that of the front bag portion 36. Namely, in this embodiment, the inflator 30L, 30R is provided in the rear bag portion 38, and the upper and lower communication apertures 46, 48 are formed in the front-rear partition tether 34, to thus provide an internal pressure adjusting means for making the internal pressure of the rear bag portion 38 higher than that of the front bag portion 36.

When the far-side airbag 32L, 32R is in an inflated and deployed state, the front bag portion 36 protrudes toward the vehicle forward side of the tunnel-side side portion 23, and a part (a rear end portion in this embodiment) of the rear bag portion 38 protrudes from the back surface of the seat back 22L, 22R to the vehicle rearward side. Namely, the far-side airbags 32L, 32R are formed such that a part of the rear bag portion protrudes rearward from the back surface of the seat back 22L, 22R in which the airbag is mounted, when the airbag is in the inflated and deployed state. Also, the whole bodies of the right and left far-side airbags 32R, 32L, when they are in the inflated and deployed state, expand toward the center of the seat backs 22R, 22L as viewed in the vehicle width direction, so that the right and left far-side airbags 32R, 32L approach each other.

As shown in FIG. 1, an ECU (controller) 54 installed on the vehicle is electrically connected to the inflators 30L, 30R and the inflators 26L, 26R of the side airbag devices 24L, 24R. A side-impact sensor 56 for detecting a side collision of the vehicle, and a seating sensor(s) (not shown) for detecting whether occupants are seated in the right and left vehicle seats 12R, 12L, are electrically connected to the ECU 54. The ECU 54, side-impact sensor 56 and the seating sensor(s) are used commonly as constituent members of the far-side airbag devices 14L, 14R and the side airbag devices 24L, 24R.

When a side collision of the vehicle (or unavoidableness thereof) is detected based on a signal from the side-impact sensor 56, the ECU 54 is configured to activate (start) the inflators 30L, 30R, 26L, 26R as needed, based on a signal(s) from the seating sensor(s). For example, if another vehicle collides with the left side portion 18L of the vehicle (see arrow F in FIG. 1) while the occupants P1, P2 are seated in the left and right vehicle seats 12L, 12R, the ECU 54 activates the inflator 26L of the left-hand side airbag device 24L, and the respective inflators 30L, 30R of the left and right far-side airbag devices 14L, 14R. As a result, the left-hand side airbag 28L and both of the left and right far-side airbags 32L, 32R are inflated and deployed, as shown in FIG. 1. If the occupant P1 is not seated in the left-hand vehicle seat 12L, the ECU 54 is configured not to activate the inflator 26L of the side airbag device 24L.

If another vehicle collides with the right side portion 18R of the vehicle while the occupants P1, P2 are seated in the left and right vehicle seats 12L, 12R, on the other hand, the ECU 54 activates the inflator 26R of the right-hand side airbag device 24R, and the respective inflators 30L, 30R of the left and right far-side airbag devices 14L, 14R. As a result, the right-hand side airbag 28R and the left and right far-side airbags 32L, 32R are inflated and expanded (though the inflated and deployed conditions in this case are not illustrated). If the occupant P2 is not seated in the right-hand vehicle seat 12L, the ECU 54 is configured not to activate the inflator 26R of the side airbag device 24R.

In this embodiment, when a side collision occurs, the right and left vehicle seats 12R, 12L approach each other in the vehicle width direction, as described above. As a result, the right and left far-side airbags 32R, 32L thus inflated and deployed abut against each other in the vehicle width direction, and the respective rear bag portions 38 of the right and left far-side airbags 32R, 32L are compressed in the vehicle width direction between the right and left seat backs 22R, 22L. Namely, the inflation widths of the right and left far-side airbags 32R, 32L as measured in the vehicle width direction, and the interval between the right and left vehicle seats 12R, 12L, etc. are set so that the respective rear bag portions 38 are compressed as described above.

With the rear bag portions 38 thus compressed, the internal pressure of each rear bag portion 38 rises, and gas in the rear bag portion 38 flows into the corresponding front bag portion 36 through the upper and lower communication apertures 46, 48, so as to increase the pressure in the front bag portion 36. The above-described compression is set to take place at least in a side collision test using MDB (Moving Deformable Barrier) (the collision velocity of MDB: 50 km/h), and a poll side collision test (the poll velocity: 32 km/h, angle of approach of poll: 15 degrees).

While the occupants P1, P2 are seated in the left and right vehicle seats 12L, 12R, respectively, in this embodiment; the ECU 54 is configured to activate both of the left and right inflators 30L, 30R upon detection of a side collision, even in the case where an occupant is seated in only one of the vehicle seats 12L, 12R. Also, while the ECU 54 is configured to activate the right and left inflators 30R, 30L at the same time when a side collision is detected in this embodiment, the invention is not limited to this arrangement. For example, the ECU 54 may be configured to activate the collision-side inflator, as one of the right and left inflators 30R, 30L, earlier than the non-collision-side inflator.

In this embodiment, the area of abutment or contact of the right and left far-side airbags 32R, 32L when they abut against each other varies depending on a difference between the longitudinal positions of the right and left vehicle seats 12R, 12L relative to the vehicle body, and a difference between the reclining angles of the right and left seat backs 22R, 22L relative to the right and left seat cushions 20R, 20L. In this respect, in this embodiment, when the reclining angles of the right and left seat backs 22R, 22L are equal, the respective rear bag portions 38 overlap each other as viewed in the vehicle width direction, as long as a difference between the longitudinal positions of the right and left vehicle seats 12L, 12R is equal to or less than about a half of the longitudinal position adjustment range.

(Operation and Effect)

Next, the operation and effect of the first embodiment will be described.

In this embodiment, if a side collision occurs to the left side portion 18L of the vehicle, in normal conditions as shown in FIG. 1, for example, the inflator 26L of the left-hand side airbag device 24L is activated, and the respective inflators 30R, 30L of both of the right and left far-side airbag devices 14R, 14L are activated. As a result, the left-hand side airbag 28L inflates and deploys, and the right and left far-side airbags 32R, 32L inflate and deploy (as shown in FIG. 1). Each of the right and left far-side airbags 32R, 32L, when it is in the inflated and deployed state, is partitioned into the front bag portion 36 that protrudes toward the vehicle forward side of the tunnel-side side portion 23, and the rear bag portion 38 that is located on the vehicle rearward side of the front bag portion 36 and has an internal pressure higher than that of the front bag portion 36.

When the vehicle has a side collision, the right and left vehicle seats 12R, 12L approach each other in the vehicle width direction due to the impact of the collision, as shown in FIG. 2. With the seats 12R, 12L thus approaching each other, the rear bag portions 38 of the right and left far-side airbags 32R, 32L are compressed between the right and left seat backs 22R, 22L. As a result, the impact is absorbed, and each of the far-side airbags 32R, 32L provides a reaction surface that receives reaction force from the other far-side airbag 32L, 32R, so that the internal pressure of each of the far-side airbags 32R, 32L is increased. Consequently, the restraint performance is improved when one (the right-hand in this example) far-side airbag 32R receives and supports the non-collision-side occupant P2.

In order to improve the occupant restraint performance of a far-side airbag, it is considered to increase the output of the inflator, and increase the internal pressure of the far-side airbag. However, if the internal pressure of the far-side airbag is excessively increased, there arises a problem in terms of the occupant protection performance (so-called OOP (out-of-position) performance) exhibited when the far-side airbag is inflated, and deployed in a condition where the occupant is located at a non-appropriate position in an inflation/deployment region of the far-side airbag. Also, the size of the inflator is increased, resulting in reduction of the efficiency and ease with which the inflator (airbag) is installed in the vehicle seat.

In this respect, according to this embodiment, it is possible to prevent the internal pressures of the right and left far-side airbags 32R, 32L from being excessively large, before the rear bag portions 38 of the right and left far-side airbags 32L, 32R are compressed between the right and left seat backs 22R, 22L. With this arrangement, sufficiently high OOP performance is assured, and the size of the inflators 30R, 30L can be reduced, thus assuring improved efficiency and ease with which the inflators (airbags) are installed in the vehicle seats 12R, 12L. Furthermore, in this embodiment, the internal pressure of each of the front bag portions 36 of the right and left far-side airbags 32R, 32L is set to be lower than the internal pressure of each of the rear bag portions 38, thus assuring high OOP performance.

In this embodiment, each far-side airbag 32R, 32L is formed such that, when the airbag 32R, 32L is in an inflated and deployed state, a part of each rear bag portion 38 protrudes rearward from the back surface of the seat back 22R, 22L in which the airbag 32R, 32L itself is mounted. Thus, since each rear bag portion 38 is extended toward the rear of the vehicle, a large amount of overlapping between each rear bag portion 38 and the right and left seat backs 22R, 22L as seen in the vehicle width direction can be ensured. Therefore, when the rear bag portions 38 are compressed between the right and left seat backs 22L, 22R, the internal pressure of each rear bag portion 38 can be effectively increased.

Next, another embodiment of the invention will be described. The same reference numerals as used in the first embodiment are assigned to the same or corresponding elements or portions as those of the first embodiment, and the configuration and operation that are basically identical with those of the first embodiment will not be described.

Second Embodiment

Figure 4:
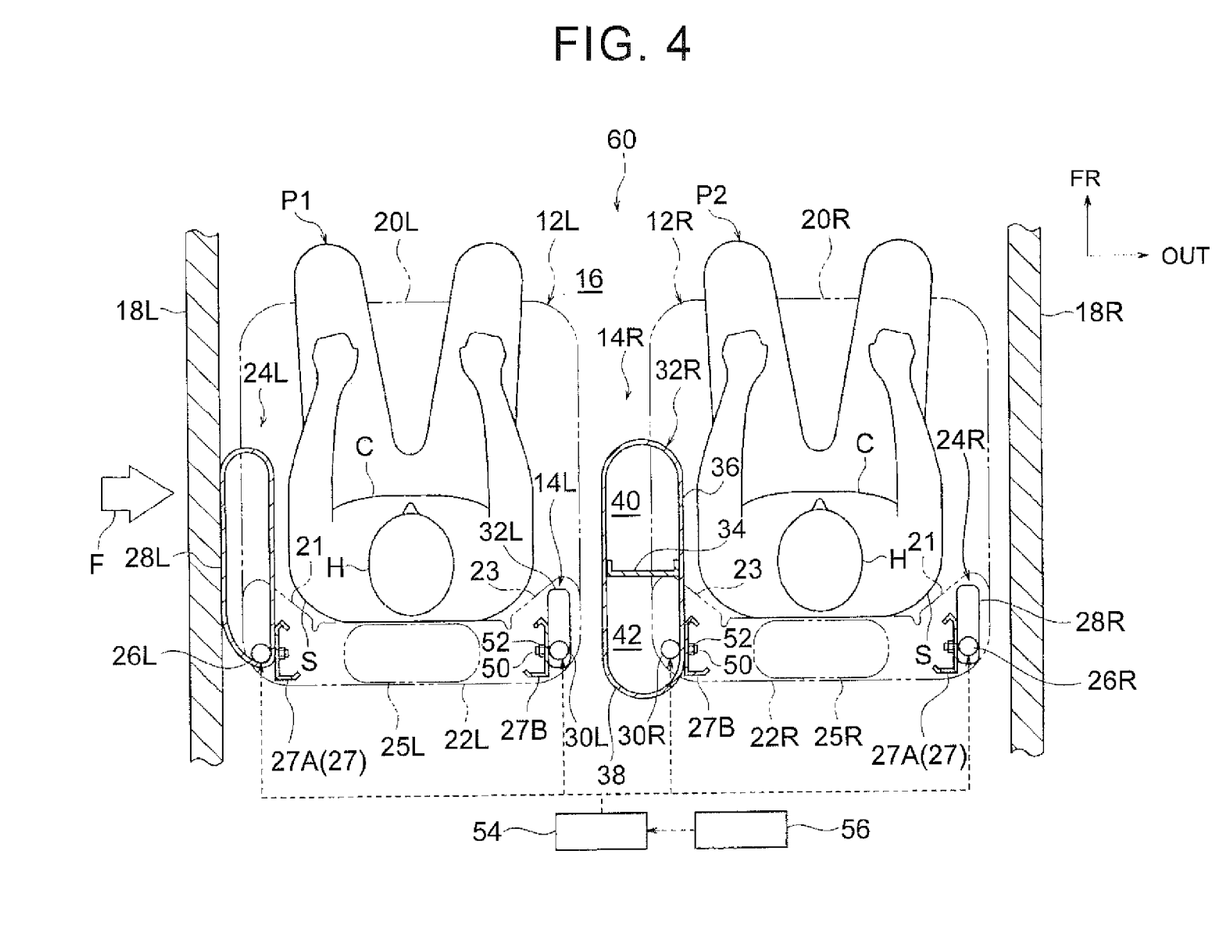
FIG. 4 is a planar sectional view showing the construction of a front part of a vehicle interior of an automobile in which a vehicular occupant protecting system according to a second embodiment of the invention is employed.

FIG. 4 is a planar sectional view showing the construction of a front part of a vehicle interior of an automobile in which an occupant protection system 60 for a vehicle according to a second embodiment of the invention is employed. While the configuration of this embodiment is basically similar to that of the first embodiment, the interval between the right and left vehicle seats 12R, 12L is set to be narrower or smaller than that of the first embodiment. Also, in this embodiment, the operational control of the inflators 26R, 26L, 30R, 30L performed by the ECU 54 is different from that of the first embodiment.

Figure 5:
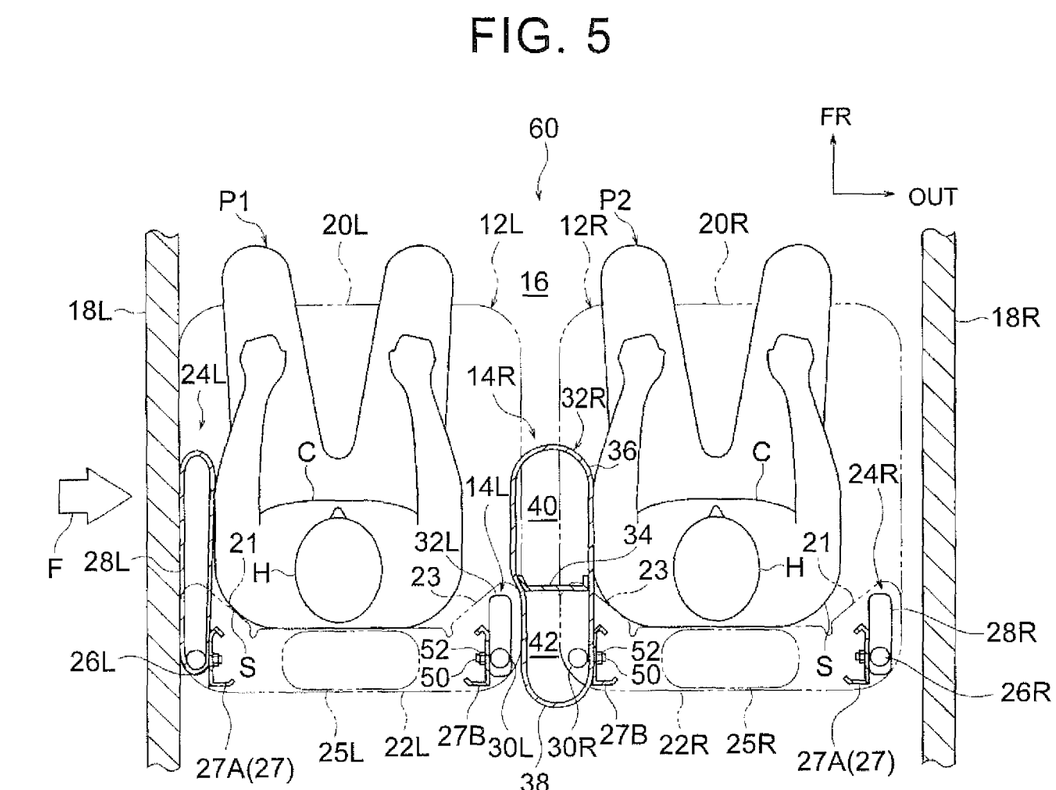
FIG. 5 is a planar sectional view corresponding to that of FIG. 4, showing a condition in which right and left vehicle seats approach each other in a vehicle width direction, due to an impact of a side collision.

When another vehicle collides with the left side portion 18L of the vehicle (see arrow F in FIG. 4), for example, the ECU 54 activates the inflator 26L of the left-hand side airbag device 24L, and the inflator 30R of the right-hand far-side airbag device 14R. As a result, the left-hand side airbag 28L and the right-hand far-side airbag 32R are inflated and deployed, as shown in FIG. 4. Also, when the side collision as described above occurs, the right and left vehicle seats 12R, 12L approach each other in the vehicle width direction (see FIG. 5), as in the first embodiment. As a result, the right-hand far-side airbag 32R thus inflated and deployed abuts against the left-hand seat back 22L, and is compressed in the vehicle width direction between the right and left seat backs 22R, 22L.

When another vehicle collides with the right side portion 18R of the vehicle, on the other hand, the ECU 54 activates the inflator 26R of the right-hand side airbag device 24R, and the inflator 30L of the left-hand far-side airbag device 14L. As a result, the right-hand side airbag 28R and the left-hand side airbag 32L are inflated and deployed (though the inflated and deployed conditions in this ease are not illustrated). In this case, too, the right and left vehicle seats 12R, 12L approach each other in the vehicle width direction, so that the left-hand far-side airbag 32L thus inflated and deployed abuts against the right-hand seat back 22R, and is compressed in the vehicle width direction between the right and left seat backs 22R, 22L. In this embodiment, too, the occupant restraint performance of the far-side airbags 32L, 32R is improved, as in the first embodiment.

Additional Description of Embodiments

In the second embodiment, the far-side airbag devices 14R, 14L are installed in both of the right and left vehicle seats 12R, 12L, respectively. However, this embodiment is not limited to this arrangement, but a far-side airbag device may be installed on either one of the right and left vehicle seats (e.g., only the driver's seat).

In each of the illustrated embodiments, the far-side airbag 32L, 32R is partitioned or divided into the front bag portion 36 and the rear bag portion 38 only by means of the front-rear partition tether 34. However, this invention is not limited to this arrangement.

Figure 6:
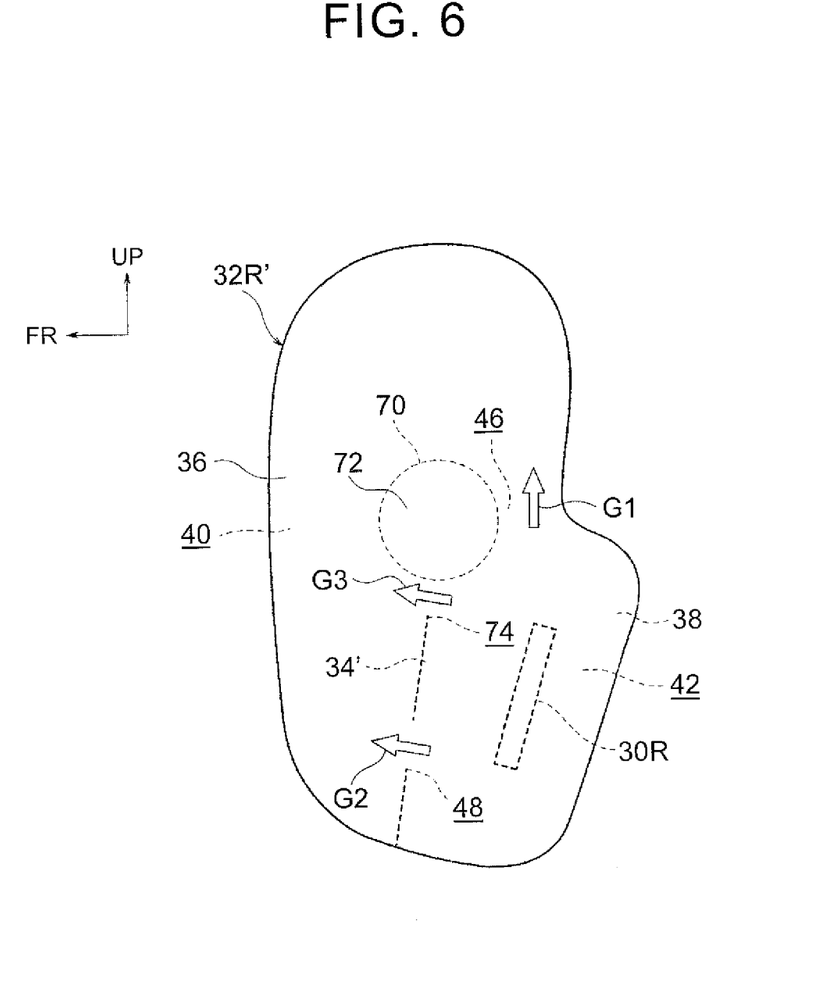
FIG. 6 is a side view showing a modified example of far-side airbag according to an embodiment of the invention.

For example, a far-side airbag 32R' as shown in FIG. 6 may be employed. A circular sewn portion (seam) 70 is set in a region that restrains the shoulder part of the occupant in a central portion of the far-side airbag 32', to provide a non-inflation portion 72. The far-side airbag 32' is partitioned into a front bag portion 36 and a rear bag portion 38, by means of the sewn portion 70 and a front-rear partition tether 34', and an intermediate communication aperture 74 that communicates the front bag portion 36 with the rear bag portion 38 is formed between the sewn portion 70 and the front-rear partition tether 34'. In FIG. 6, arrows G1-G3 indicate flows of gas supplied from the rear bag portion 38 to the front bag portion 36. Since the far-side airbag 32' is constructed as described above, the far-side airbag 32' thus inflated and deployed can be prevented or restrained from being pushed by the shoulder part of the occupant and unexpectedly displaced away from the occupant.

While the side-impact sensor 56 for detecting a side collision is connected to the ECU 54 in each of the illustrated embodiments, the invention is not limited to this arrangement, but a pre-crash sensor that predicts a side collision may be connected to the ECU 54. In this case, one or more of the inflators as described above is/are activated as needed when the ECU 54 predicts a side collision, based on a signal from the pre-crash sensor.

While a center console is not provided between the right and left vehicle seats 12R, 12L in each of the illustrated embodiments, this invention is not limited to this arrangement, but the invention may be applied to a vehicle in which a center console is provided between the right and left vehicle seats.

While the right and left vehicle seats 12R, 12L are the driver's seat and the passenger seat in each of the illustrated embodiments, this invention is not limited to this arrangement, but the right and left vehicle seats may be rear seats (the second-row or subsequent-row seats) of the vehicle, provided that the seats are installed independently of each other in the lateral direction.

This invention may be embodied with various other changes, without departing from the principle of the invention. It is also to be understood that the scope of the invention is not limited to each of the above-described embodiments.

What is claimed is:

1. An occupant protection system for a vehicle, the occupant protection system comprising:
   right and left vehicle seats disposed adjacent to each other in a vehicle width direction and adapted to approach each other in the vehicle width direction due to an impact at a time of a side collision;

right and left inflators each mounted in a center-side side portion, as viewed in the vehicle width direction, of each of seat backs of the right and left vehicle seats, each of the inflators being adapted to be activated at the time of the side collision so as to generate gas; and right and left far-side airbags each mounted in the center-side side portion, as viewed in the vehicle width direction, of each of the seat backs, each of the far-side airbags being adapted to inflate and deploy when the gas is supplied from a corresponding one of the inflators, each of the far-side airbags being partitioned into a front bag portion that protrudes toward a vehicle forward side of the center-side side portion when the airbag is in an inflated and deployed state, and a rear bag portion located on a vehicle rearward side of the front bag portion, the rear bag portion being adapted to have an internal pressure higher than an internal pressure of the front bag portion when the airbag is inflated and deployed, the rear bag portion of each of the far-side airbags being adapted to be compressed between the seat backs when the vehicle seats approach each other.

2. The occupant protection system according to claim 1, wherein each of the far-side airbags is formed such that a part of the rear bag portion protrudes rearward from a back surface of the seat back in which the far-side airbag is mounted when the airbag is in the inflated and deployed state.

3. The occupant protection system according to claim 1, wherein:

the front bag portion is configured to restrain, in the inflated and deployed state., front portions of a shoulder part, a chest part, and a belly part of an occupant, and a head part of the occupant; and the rear bag portion is configured to restrain, in the inflated and deployed state, rear portions of the shoulder part, the chest part, and the belly part of the occupant.

4. The occupant protection system according to claim 1, wherein:

the front bag portion and the rear bag portion are partitioned by a front-rear partition tether;

an interior of the front bag portion provides a front chamber, and an interior of the rear bag portion provides a rear chamber; and the front chamber and the rear chamber communicate with each other, via an upper communication aperture provided in an upper end portion of the front-rear partition tether, and a lower communication aperture provided in a lower portion of the front-rear partition tether.

5. The occupant protection system according to claim 1, further comprising a controller that activates at least one of the inflators when determining occurrence of a side collision of the vehicle, wherein the controller activates a side-airbag-inflator of a side airbag device on a collision side, and the right and left inflators that supply gas to the right and left far-side airbags, when determining the occurrence of the side collision while occupants are seated in the right and left vehicle seats.

6. The occupant protection system according to claim 1, further comprising a controller that activates at least one of the inflators when determining occurrence of a side collision of the vehicle, wherein the controller activates the right and left inflators that supply gas to the right and left far-side airbags without activating a side-airbag-inflator of a side airbag device on a collision side, when determining the occurrence of the side collision while no occupant is seated in one of the vehicle seats on the collision side.

7. The occupant protection system according to claim 1, wherein each of the right and left inflators that supply gas to the far-side airbags is a cylinder-type inflator formed in a cylindrical shape, and is mounted in a middle portion of the rear bag portion as viewed in a front-back direction and an up-down direction such that an axial direction of the inflator is substantially in parallel with a height direction of the seat back.

8. The occupant protection system according to claim 7, wherein each of the right and left inflators that supply gas to the far-side airbags is fixed to a central portion of a side frame of the seat back as viewed in the up-down direction and the front-back direction.

9. The occupant protection system according to claim 1, wherein when reclining angles of the right and left seat backs are equal, the rear bag portions of the far-side airbags are arranged to overlap each other as viewed in the vehicle width direction, as long as a difference between longitudinal positions of the right and left vehicle seats is equal to or less than about a half of a longitudinal position adjustment range.

10. The occupant protection system according to claim 1, wherein:

a circular sewn portion is set in a central portion of each of the far-side airbags, to provide a non-inflation portion;

each of the far-side airbags is partitioned by the circular sewn portion and a front-rear partition tether into a front back portion and a rear back portion; and an intermediate communication aperture that communicates the front bag portion and the rear bag portion with each other is formed between the circular sewn portion and the front-rear partition tether.

11. An occupant protection system for a vehicle, the occupant protection system comprising:

right and left vehicle seats disposed adjacent to each other in a vehicle width direction and adapted to approach each other in the vehicle width direction due to an impact at a time of a side collision;

an inflator mounted in a center-side side portion, as viewed in the vehicle width direction, of a seat back of one of the right and left vehicle seats, the inflator being adapted to be activated at the time of the side collision so as to generate gas; and a far-side airbag mounted in the center-side side portion and adapted to inflate and deploy when the gas is supplied from the inflator, the far-side airbag being partitioned into a front bag portion that protrudes toward a vehicle forward side of the center-side side portion when the airbag is in an inflated and deployed state, and a rear bag portion located on a vehicle rearward side of the front bag portion, the rear bag portion being adapted to have an internal pressure higher than an internal pressure of the front bag portion when the airbag is inflated and deployed, the rear bag portion being adapted to be compressed between the seat backs of the right and left vehicle seats when the vehicle seats approach each other.

12. The occupant protection system according to claim 11, wherein the far-side airbag is formed such that a part of the rear bag portion protrudes rearward from a back surface of the seat back in which the far-side airbag is mounted when the airbag is in the inflated and deployed state.

13. The occupant protection system according to claim 11, wherein:
the front bag portion is configured to restrain, in the inflated and deployed state, front portions of a shoulder part, a chest part, and a belly part of an occupant, and a head part of the occupant; and
the rear bag portion is configured to restrain, in the inflated and deployed state, rear portions of the shoulder part, the chest part, and the belly part of the occupant.

14. The occupant protection system according to claim 11, wherein:
the front bag portion and the rear bag portion are partitioned by a front-rear partition tether;
an interior of the front bag portion provides a front chamber, and an interior of the rear bag portion provides a rear chamber; and
the front chamber and the rear chamber communicate with each other, via an upper communication aperture provided in an upper end portion of the front-rear partition tether, and a lower communication aperture provided in a lower portion of the front-rear partition tether.

15. The occupant protection system according to claim 11, further comprising
a controller that activates the inflator when determining occurrence of a side collision of the vehicle, wherein
the controller activates a side-airbag-inflator of a side airbag device on a collision side, and the inflator that supplies gas to the far-side airbag, when determining the occurrence of the side collision while occupants are seated in the right and left vehicle seats.

16. The occupant protection system according to claim 11, further comprising
a controller that activates the inflator when determining occurrence of a side collision of the vehicle, wherein
the controller activates the inflator that supplies gas to the far-side airbag without activating a side-airbag-inflator of a side airbag device on a collision side, when determining the occurrence of the side collision while no occupant is seated in one of the vehicle seats on the collision side.

17. The occupant protection system according to claim 11, wherein
the inflator that supplies gas to the far-side airbag is a cylinder-type inflator formed in a cylindrical shape, and is mounted in a middle portion of the rear bag portion as viewed in a front-back direction and an up-down direction such that an axial direction of the inflator is substantially in parallel with a height direction of the seat back.

18. The occupant protection system according to claim 17, wherein
the inflator that supplies gas to the far-side airbag is fixed to a central portion of a side frame of the seat back as viewed in the up-down direction and the front-back direction.

19. The occupant protection system according to claim 11, wherein:
a circular sewn portion is set in a central portion of the far-side airbag, to provide a non-inflation portion;
the far-side airbag is partitioned by the circular sewn portion and a front-rear partition tether into a front back portion and a rear back portion; and
an intermediate communication aperture that communicates the front bag portion and the rear bag portion with each other is formed between the circular sewn portion and the front-rear partition tether.

* * * * *